United States Patent [19]

Chalmers

[11] 4,264,072
[45] Apr. 28, 1981

[54] ELECTRONIC GAME APPARATUS

[76] Inventor: John E. Chalmers, 7511 Linde La., Fort Wayne, Ind. 46815

[21] Appl. No.: 909,920

[22] Filed: May 26, 1978

[51] Int. Cl.³ .............................................. A63F 9/22
[52] U.S. Cl. ........................... 273/85 G; 273/DIG. 28
[58] Field of Search ............... 273/85 G, 101.2, 101.1, 273/237, 238; 340/323 R, 552, 553, 709, 712, 365 C; 307/116

[56] References Cited

U.S. PATENT DOCUMENTS

| | | | |
|---|---|---|---|
| 3,482,241 | 12/1969 | Johnson | 340/365 C |
| 3,631,472 | 12/1971 | Lincoln | 340/365 C |
| 3,728,480 | 4/1973 | Baer | 35/9 B X |
| 3,740,744 | 6/1973 | Nakada et al. | 340/365 C |
| 3,750,126 | 7/1973 | Solomon | 307/116 |
| 3,761,736 | 9/1973 | Edge et al. | 340/365 C |
| 3,801,799 | 4/1974 | Atkins | 307/116 |
| 3,921,161 | 11/1975 | Baer | 273/85 G X |
| 3,991,329 | 11/1976 | Iwasa et al. | 307/116 |
| 4,029,996 | 6/1977 | Miffitt | 307/116 |
| 4,071,691 | 1/1978 | Pepper, Jr. | 273/DIG. 28 |
| 4,110,749 | 8/1978 | Janko et al. | 340/712 |
| 4,111,421 | 9/1978 | Mierzwinski | 273/85 G |
| 4,121,204 | 10/1978 | Welch et al. | 340/712 |

OTHER PUBLICATIONS

Turner, R. P.; *Mosfet Circuits Guidebook With 100 Tested Projects;* 1975; pp. 98, 99.
Lytel, A.; *Handbook of Transistor Circuits;* 1963; pp. 88, 89.
Sessions, K. W.; *Master Handbook of 1001 Practical Electronic Circuits;* 1975; pp. 18, 19.
Mim, F. M.; *Transistor Projects;* vol. 4; 1976; pp. 89–93.
*Mechanix Illustrated;* vol. 73, No. 588; May 1977; pp. 110–114.
*Popular Mechanics;* vol. 148, No. 6; Dec. 1977; pp. 92, 93.
Millman, J. and Halkias, C.; *Electronic Devices and Circuits;* 1967; pp. 413–415.
Shields, J. P.; *Detectors and Metal Locators;* 1972; pp. 7–9, 87–97, 149–157.
Ciarcia, S.; *73 Magazine;* Oct. 1976; pp. 104–108.
Margolin, B.; *Modern Electronics;* Mar. 1978; pp. 36–43.

*Primary Examiner*—Vance Y. Hum
*Attorney, Agent, or Firm*—Gust, Irish, Jeffers & Hoffman

[57] ABSTRACT

An electronic game apparatus for use with circuitry which position controls a game object on the screen of a cathode-ray tube, such as is used in standard television receivers. The apparatus translates player's position and movement, and in particular a player's hand, to corresponding movement of the game object on the screen. The apparatus is capable of non-tactile sensing of the player's movement and in the preferred embodiment utilizes a field effect transistor with an antenna member coupled to the gate of the transistor, with the player's position and movement relative to the antenna member resulting in corresponding game object movement on the tube screen.

8 Claims, 3 Drawing Figures

ELECTRONIC GAME APPARATUS

BACKGROUND OF THE INVENTION

1. Field of the Invention

This invention is in the field of electronic game apparatus and more particularly to that apparatus which is usable with circuitry for controlling the display of a game object on the screen of a cathode-ray tube.

2. Description of the Prior Art

In recent years, game playing devices adapted for attachment to standard television receivers to manually control, for games ranging from "ping-pong" to space wars, the display of a game object on the receiver tube screen have enjoyed noteworthy public acceptance and wide usage. In general, the prior art game apparatus utilized manually operated controls, such as dials, switches, or levers mounted for universal movement to obtain corresponding movements of a game object on the screen. Examples of such games may be found in the following publications: 73 MAGAZINE, #192, October 1976, "Hey, Look What My Daddy Built!" by Steve Ciarcia; POPULAR MECHANICS, vol. 148, No. 6, December 1977, "New TV Games: Livelier, Smarter" by Dave Sagarin; MODERN ELECTRONICS, Vol. 1, No. 2, March 1978, "Videogames Roundup: the Best and Most Fun" by Bob Margolin; MECHANIX ILLUSTRATED, Vol. 73, No. 588, "Those Amazing New TV Games" by Robert D. Freed.

In addition, devices are known in the art for utilizing body capacitance for non-tactile control of various devices including switches, varying a musical frequency, and intrusion sensing devices. Examples of these devices are found in the following publications: TRANSISTOR PROJECTS, Vol. 4, pp. 89-93, "Super-Simple FET Touch Switch" by Forrest M. Mims, III; HOW TO BUILD PROXIMITY DETECTORS & METAL LOCATORS, pp. 7-9, 87-97, 149-157, "Proximity Detectors and Metal Locators" by John Potter Shields; 49 EASY TRANSISTOR PROJECTS, pp. 6-9 by Robert M. Brown & Tom Kneiter; HANDBOOK OF TRANSISTOR CIRCUITS, pp. 88, 89, By Allan Lytel; MASTER HANDBOOK OF 1001 PRACTICAL ELECTRONIC CIRCUITS, pp. 18, 19, by K. W. Sessions; and MOSFET CIRCUITS GUIDEBOOK WITH 100 TESTED PROJECTS, pp. 98-101, by Rufus P. Turner.

However, the art, as determined from the aforereferenced publications, does not provide a device which can translate the movement of a human body member, such as a hand, to a corresponding movement of a game object or indicia on the screen of a cathode-ray tube, notwithstanding the versatility and increased game interest resulting from such capability.

SUMMARY OF THE INVENTION

A cathode-ray tube, such as is commonly used in a standard television receiver, is provided with circuitry for scanning a predetermined raster and providing a video signal to the control electrodes of the tube, in combination with the scanning raster, to provide a visual display on the tube screen. In well known and conventional manners, the video signal is coordinated with the scanning raster signal to provide a desired positional display on the tube screen. In a standard television receiver, the video signal and synchronizing signals for the raster display are received from transmitting stations.

Commercially available integrated circuits are coupled to the inputs of the receiver and provide a display on the tube screen in accordance with a selected game mode circuit. Further, the integrated circuit has input pins for receiving manually adjustable signals, commonly obtained by a player's operated potentiometer, for controlling a game object such as a paddle, ball, or the like, for player's controlled movement of a display on the tube screen. Coupled to such circuit input, and in combination with the potentiometer, are the drain and source terminals of a field effect transistor, which has the gate thereof coupled to an antenna. According to the teaching of this invention, the player's body movement in non-tactile proximity to the antenna varies the amplitude of the current conduction in the transistor to correspondingly vary the input to the circuit. The circuit output is coupled to the video input to the cathode-ray tube circuitry and will correspondingly change the position of a game object on the screen of the tube. In this manner, in those games utilizing a paddle, the paddle position and movement on the screen can correspond to hand position and movement in proximity to the antenna, thus simulating a game condition not heretofore available. A light emitting diode may be placed in series with the transistor to provide a light intensity indication of player's proximity to the antenna. In an alternate embodiment, when the hand is removed from proximity to the antenna, the corresponding symbol display disappears from the screen. The circuitry of this invention is relatively simple and inexpensive, low in maintenance expense, and reliable in operation.

Therefore, it is an object of this invention to provide electronic game apparatus which closely simulates actual game playing hand position by the player.

Another object of this invention is to provide in the device of the previous object a simplified circuitry relatively low in manufacturing cost and requiring relatively low maintenance.

A further object of this invention is to provide in the devices of the previous objects a circuitry for causing disappearance of the corresponding symbol on the display screen when the player's hand is removed a predetermined distance from the circuitry sensing elements.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
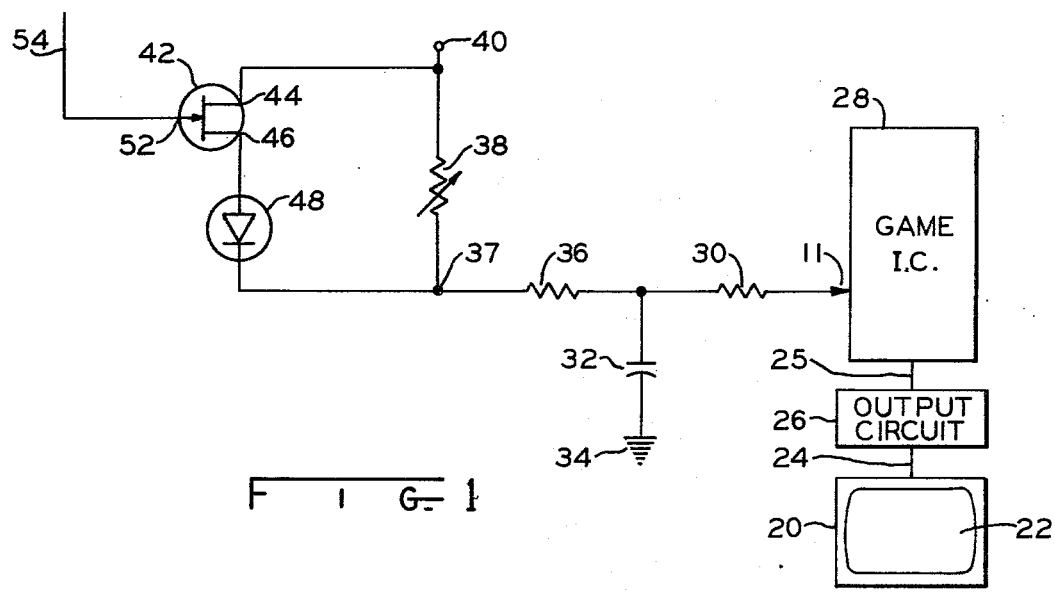
FIG. 1 is a partially schematic, partially block diagram of a preferred embodiment of this invention.

Referring to the drawings, a conventional television receiver 20 has a cathode-ray tube with display screen 22 mounted therein and conventional circuitry for causing a scanning raster on screen 22. Video input 24 to receiver 20, which is coordinated with the scanning circuitry in conventional manner in the receiver, is coupled to an output circuit 26 of a game integrated circuit 28, which is commercially available from General Instruments Corp., 602 W. John Street, Hicksville, N.Y., 11802, and has Model No. AY38500-1. Circuit 26 represents that circuit connection for output lead 25 which represents pins 5, 8, 9, 21, 1 and 13 of integrated circuit 28, as shown in FIG. 1 page 105 of *73 MAGAZINE* aforereferenced. Pin 11 of circuit 28 is coupled to one terminal of resistance 30, the other terminal of which is coupled through capacitor 32 to ground 34 and one terminal of resistance 36. The other terminal of resistance 36 is coupled to junction 37 and one terminal of manually adjustable potentiometer 38, the other terminal of which is coupled to voltage source 40, which in this embodiment may be +6.2 volts.

Coupled across potentiometer 38 is a FET (field effect transistor) 42 having its drain terminal 44 connected to voltage source 40 and its source terminal 46 connected to the anode of a LED (light emitting diode) 48 which has its cathode connected to the junction 37 between resistance 36 and potentiometer 38. Gate 52 of FET 42 is coupled to antenna 54, which may be a simple short length of wire, is supported in player accessible position.

In the operation of the embodiment of FIG. 1, manual adjustment of potentiometer 38 will vary the voltage input to pin 11 of circuit 28, resulting in a corresponding variation at the output of circuit 26, and is connected to the video input 24 of receiver 20. Manual adjustment of potentiometer 38, as is understood in conventional circuits, will cause a corresponding movement of a paddle in a game display on screen 22.

With a given setting of potentiometer 38, to obtain corresponding position of a paddle on the screen 22 of the receiver 20, which position could advantageously be located in a vertically centered position on the screen and to one side of the screen, movement of a player hand in the proximity of antenna 54 will cause a corresponding change in current amplitude conduction through FET 42 resulting in a corresponding movement of the paddle display on screen 22 of receiver 20. Thus, a player in a game such as ping pong or tennis, could, with paddle or racket hand movements which would be used in actually playing a game of ping pong or tennis, cause a corresponding movement of the paddle on the screen 22 to intercept a moving game object symbol such as a ping pong or tennis ball. It is to be understood that the circuitry shown in FIG. 1 for one player and typically two or more similar circuits would be used with integrated circuit 28 for multiple players. Further, the degree of FET 42 conduction can be seen by viewing the intensity of light emitting diode 48, with the higher conduction of FET 42 being visually detected by a brighter visual output from diode 48. The closer the player's hand to antenna 54, the higher the conduction in FET 42. Resistances 30, 36 and capacitor 32 form a low pass filter and also provide for current limiting to integrated circuit 28.

Figure 1A:
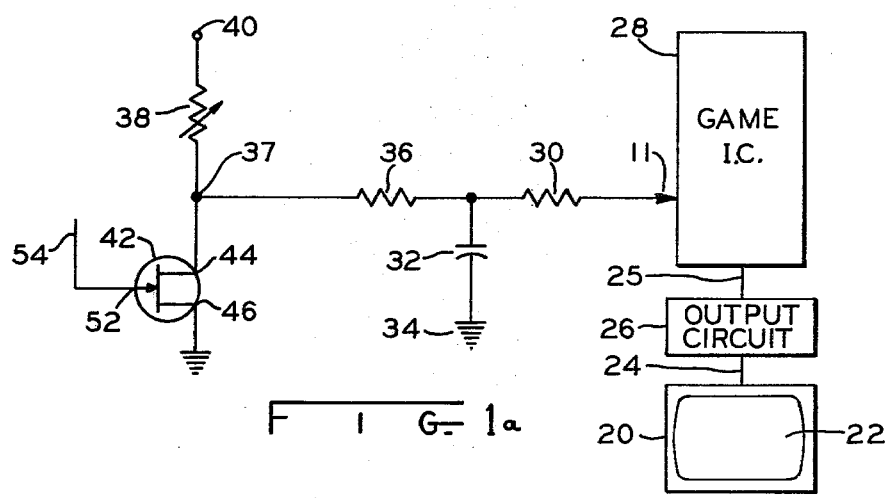
FIG. 1a is a partially schematic, partially block diagram of a second embodiment of this invention.

Referring to FIG. 1a, field effect transistor 42 may also be coupled between terminal 37 and ground 34, with the drain terminal connected to terminal 37 and the source terminal connected to ground with antenna 54 being coupled to the gate terminal as before. The operation of this embodiment is similar to that for the embodiment of FIG. 1, with the player's body capacitance being proximity coupled to antenna 54 to vary the conduction of FET 42a and thus very the signal to pin 11 of circuit 28.

Figure 2:
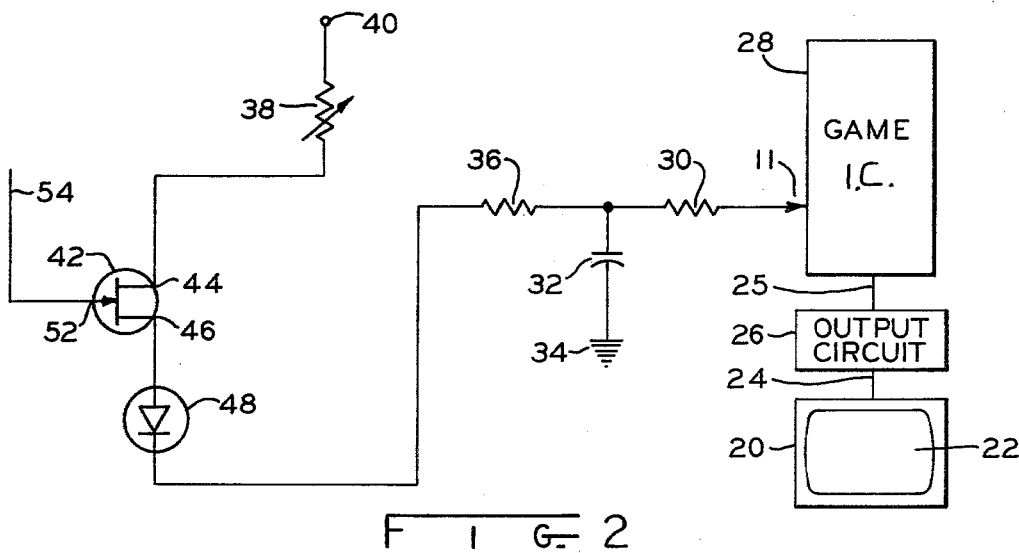
FIG. 2 is a partially schematic, partially block diagram of a third preferred embodiment of this invention.

Referring to FIG. 2, a further embodiment is shown wherein field effect transistor 42b is coupled in series with potentiometer 38 instead of in parallel. The drain terminal 44 is connected through potentiometer 38 to voltage source 40, which also may be +6.2 volts, and source 46 is connected to the anode of LED 48, the cathode of which is connected to one terminal of resistance 36. The other terminal of resistance 36 is coupled through capacitor 32 to ground 34 and to one terminal of resistance 30, the other terminal of which is connected to pin 11 of integrated circuit chip 28. The circuit 28 is coupled through circuit 26 to video drive input 24 of receiver 20. The manner of operation of the embodiment of FIG. 2 is similar to that of the embodiment of FIG. 1 with the player's body proximity to antenna 54 changing the current conductance of transistor 42, thus varying the current across resistances 36, 30 and signal to input pin 11. Also, as in the embodiment of FIG. 1, the stronger current will cause a higher illumination of LED 48 to give a visual brightness indication of the operation of the device. The closer that the player's hand is to antenna 54, the greater the induced charge on antenna 54 and the higher the current amplitude between drain 44 and source 46, in effect lowering the resistance of FET 42 to vary the signal to input 11 of circuit 28 and to the video signal input 24 receiver 20. As the induced charge on antenna 54 is varied due to the corresponding proximity of the player's hand to antenna 54, the signal appearing at input 24 is varied thus varying the paddle symbol position correspondingly on screen 22. However, in the embodiment shown in FIG. 2, when the player's hand is removed from the vicinity of antenna 54, since FET 42 is in series with potentiometer 38 and resistance 36, the paddle display symbol disappears from the screen 22 of receiver 20.

In a satisfactory working embodiment, the following circuit component values were used:

| Component | Value | Component | Value |
|---|---|---|---|
| FET 42 | RS 2035 714 | Resistance 30 | 220 Ohms |
| Circuit 28 | General Instruments | Resistance 36 | 10 K Ohms |
|  | AY 38500-1 | Potentiometer 38 | 1 Meg Ohm |
|  |  | Capacitor 32 | .001 Mfd. |

While there have been described above the principles of this invention in connection with specific apparatus, it is to be clearly understood that this description is made only by way of example and not as a limitation to the scope of the invention.

What is claimed is:

1. Apparatus for playing games utilizing a cathode-ray tube having a display screen comprising:
   first means for generating signals coupled to the tube to position-control a game object symbol on the screen; second means coupled to said first means for non-tactile capacitance sensing of a player's body limb position and movement and for providing a signal variable in response to said player's body limb position and movement thereby to position-control the game object symbol on the screen corresponding to said player's body limb position and movement;
   said second means comprising circuit means for providing a video signal for displaying on said tube screen said symbol in correspondence with and in response to said variable signal;

non-tactile sensing signal means for providing signal variation in accordance with a sensed player non-tactile proximity change; and coupling means for coupling said variable signal to said circuit means whereby said sensed proximity change will vary the signal to said circuit means and correspondingly vary said video signal;

said sensing means comprising a player's non-tactile proximity sensing current conducting means for varying the amplitude of current conduction in accordance with said proximity change;

said coupling means providing a resistance coupling between said non-tactile sensing means and said circuit means to vary the signal voltage to said circuit means in accordance with said non-tactile proximity change, said non-tactile sensing means comprising a field effect transistor having a gate, source, and drain; the gate of said transistor being coupled to an antenna for non-tactile proximity coupling to said player's body limb position and movement whereby the current conductivity between said source and drain is varied in a predetermined manner by the distance variance in non-tactile proximity coupling beteen said gate and said player's position.

2. The apparatus of claim 1 including a voltage supply;

a potentiometer coupled between said supply and said circuit means;

said drain and source being coupled across said potentiometer.

3. The apparatus of claim 2 including a light emitting diode being coupled in series with said drain and source across said potentiometer.

4. The apparatus of claim 1 including a voltage supply coupled to said circuit means;

said drain and source being coupled in series between said supply and circuit means whereby the electrical coupling between said supply and circuit means will be open in the absence of player's proximity to said antenna.

5. The apparatus of claim 1 including a voltage supply;

a potentiometer being connected to said supply and being connected to said coupling means;

said drain and source being coupled in series between ground and the connection of said potentiometer and coupling means.

6. The apparatus of claim 1 including a voltage supply;

a potentiometer and light emitting diode being coupled in series with said source and drain between said supply and said coupling means.

7. An electronic game apparatus utilizing a cathode-ray tube having a display screen, a system for non-tactile position-control of a game object symbol on said screen comprising:

antenna means for non-tactile sensing of the body capacitance of a player thereto, said sensed body capacitance varying in response to the degree of proximity of the player and the movement of the player with respect to said antenna means; means coupled to said antenna means for providing a control signal having a voltage level variable in response to the degree of the sensed body capacitance; and means coupled to said control signal means and adapted to be coupled to said tube for position-controlling a game-object symbol on said screen in response to said control signal whereby said symbol is moved in correspondence with said player's position and movement.

8. The system of claim 7 wherein said control means terminates said control signal when said player is out of the proximity of said antenna means, and said position-controlling means extinguishes the game-object symbol display on said screen in the absence of said control signal.

* * * * *